United States Patent
Terhune et al.

[19]

[11] Patent Number: 6,128,361

[45] Date of Patent: Oct. 3, 2000

[54] COATING FOR REDUCING CORROSION OF ZIRCONIUM-BASED ALLOYS INDUCED BY β-PARTICLE IRRADIATION

[75] Inventors: James Howard Terhune, San Jose; Barry Monroe Gordon, Monte Sereno, both of Calif.

[73] Assignee: General Electric Company, Schnectady, N.Y.

[21] Appl. No.: 08/621,673

[22] Filed: Mar. 26, 1996

[51] Int. Cl.⁷ .............................. G21C 7/10; G21F 1/08
[52] U.S. Cl. .............................. 376/305; 376/327
[58] Field of Search ..................... 376/305, 327

[56] References Cited

U.S. PATENT DOCUMENTS

| | | | |
|---|---|---|---|
| 3,375,169 | 3/1968 | McHugh et al. | 376/305 |
| 3,574,059 | 4/1971 | Sodergard | 376/327 |
| 3,726,642 | 4/1973 | Isaacs et al. | 376/305 |
| 3,745,069 | 7/1973 | Sofer et al. | 376/435 |
| 4,022,662 | 5/1977 | Gordon et al. | 176/82 |
| 4,029,545 | 6/1977 | Gordon et al. | 176/82 |
| 4,208,453 | 6/1980 | Baldi | 427/237 |
| 4,229,260 | 10/1980 | Johnson et al. | 176/82 |
| 4,266,987 | 5/1981 | Wang | 148/6.3 |
| 4,297,150 | 10/1981 | Foster et al. | 148/6.3 |
| 4,354,999 | 10/1982 | Priest | 376/142 |
| 4,526,626 | 7/1985 | Carter | 148/6.14 R |
| 4,649,086 | 3/1987 | Johnson | 428/627 |
| 4,654,170 | 3/1987 | Murray | 252/626 |
| 4,724,016 | 2/1988 | Anthony | 148/421 |
| 4,728,488 | 3/1988 | Gillett et al. | 376/327 |
| 4,828,790 | 5/1989 | Honda et al. | 376/306 |
| 4,836,976 | 6/1989 | Jacobs | 376/305 |
| 4,873,117 | 10/1989 | Hertz et al. | 376/305 |
| 5,026,517 | 6/1991 | Menken et al. | 376/438 |
| 5,057,340 | 10/1991 | Iyer et al. | 427/367 |
| 5,108,697 | 4/1992 | Esposito et al. | 376/306 |
| 5,135,709 | 8/1992 | Andresen et al. | 376/305 |
| 5,147,597 | 9/1992 | Roofthooft et al. | 376/305 |
| 5,237,595 | 8/1993 | Woodcock | 376/353 |
| 5,247,549 | 9/1993 | Cearley et al. | 376/327 |
| 5,317,610 | 5/1994 | Kita et al. | 376/414 |
| 5,377,244 | 12/1994 | Stenger | 376/305 |
| 5,377,245 | 12/1994 | Uetake et al. | 376/305 |
| 5,555,280 | 9/1996 | Cartry | 376/260 |

FOREIGN PATENT DOCUMENTS

| | | | |
|---|---|---|---|
| 670534 | 9/1963 | Canada | 376/305 |
| 0036469 | 3/1979 | Japan | 376/305 |
| 0121197 | 9/1980 | Japan | 376/305 |
| 0153284 | 4/1981 | Japan | 376/305 |
| 0026785 | 2/1982 | Japan | 376/327 |
| 0126996 | 7/1984 | Japan | 376/305 |

OTHER PUBLICATIONS

Fusion Technology, vol. 8, pp 2379–2383, Luthardt, Sep. 1985.
Nucl. Eng. Int., pp 23, 24, Apr. 1981.
Lemaignan, "Impact of β–Radiolysis and Transient Products on Radiation–Enhanced Corrosion of Zirconium Alloys," Journal of Nuclear Materials 187 (1992), pp. 122–130.

*Primary Examiner*—Harvey E. Behrend
*Attorney, Agent, or Firm*—Gary M. Hartman; Domenica N. S. Hartman; James E. McGinness

[57] ABSTRACT

A technique for reducing the shadow corrosion effect in zirconium-based alloys caused by β-particles emitted by adjacent components containing one or more elements that emit β-particle flux when activated by neutron capture. The technique entails providing a coating capable of absorbing β-particles, so as to mitigate the adverse effect of β-particle bombardment of a zirconium-based alloy. Preferred coating materials include beryllia, beryllium, tin, zinc, chromium and cadmium. The coatings can be applied to various nuclear reactor structural alloys, such as stainless steel and nickel, platinum, copper, hafnium and yttrium-based alloys containing 0.2 weight percent manganese or more.

4 Claims, 2 Drawing Sheets

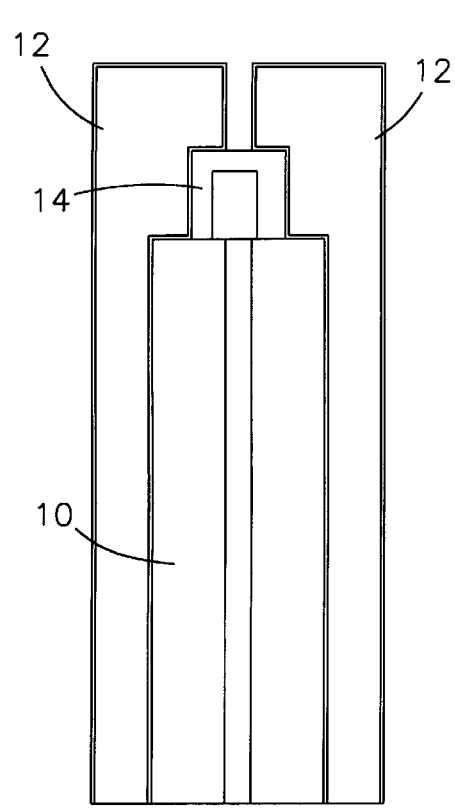
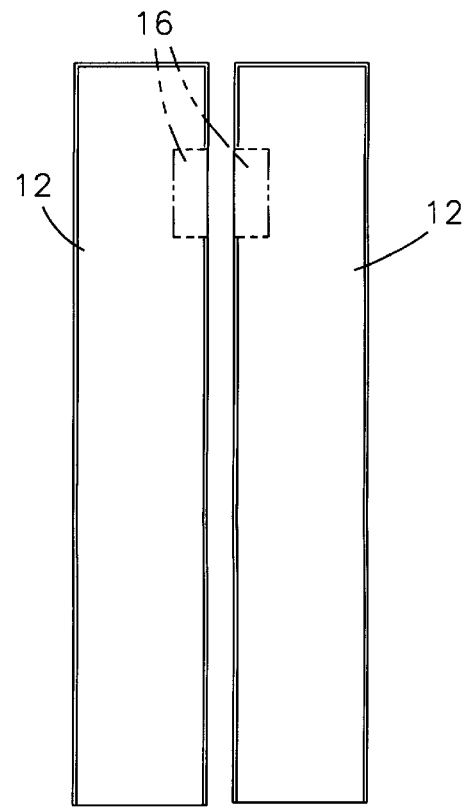
FIG.1  FIG.2
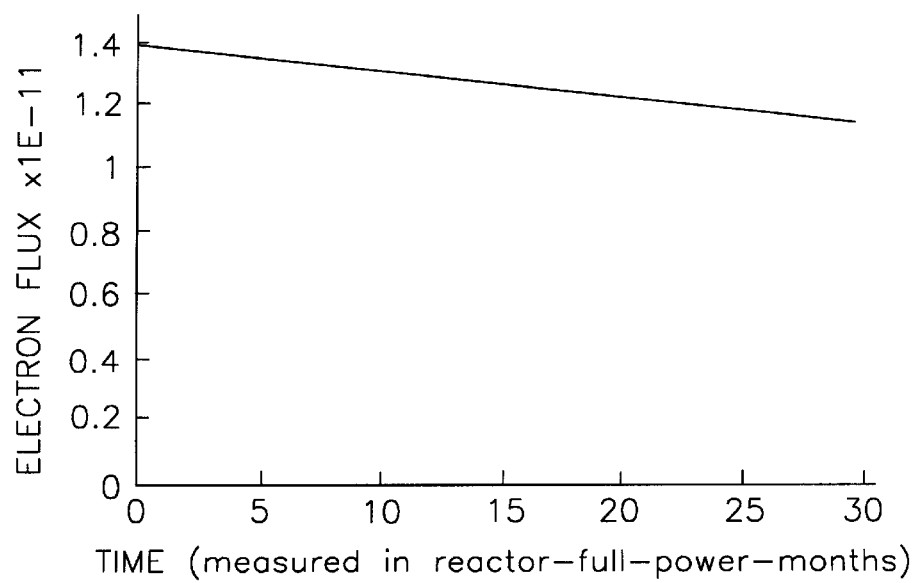
FIG.3

COATING FOR REDUCING CORROSION OF ZIRCONIUM-BASED ALLOYS INDUCED BY β-PARTICLE IRRADIATION

The present invention generally relates to techniques for improving the corrosion resistance of zirconium-based alloy components in a nuclear reactor environment. More particularly, this invention relates to a technique for reducing the irradiation of zirconium-based alloy components by beta particles emitted by adjacent components, such that localized corrosion of such zirconium-based components caused by beta particle irradiation is reduced.

BACKGROUND OF THE INVENTION

Corrosion studies of components subjected to nuclear irradiation have indicated that zirconium-based alloys can suffer localized enhanced corrosion in a radiation field if they are positioned adjacent certain stainless steels or platinum, copper, hafnium or yttrium-based alloys. This localized corrosion effect, referred to as "shadow corrosion," occurs when an alloying element or impurity in the adjacent material becomes activated by neutron capture and subsequently emits β-particles. The β-particles impinge the zirconium-based alloy, producing a "shadow" corrosion image of the adjacent body on the alloy, to the extent that the alloys useful life may be limited by both localized general corrosion and an increase in stress due to oxide volume changes.

Within nuclear reactor cores, high strength austenitic stainless steels containing up to six weight percent manganese are used to form the handles of control blades placed between the fuel channels that enclose nuclear fuel bundles. The fuel channels are typically formed from a zirconium-based alloy such as ZIRCALOY-2 or ZIRCALOY-4, and have been found to be prone to shadow corrosion, which appears on the surface of the fuel channels as an image of the stainless steel handle of the adjacent control blade. It has been further determined that neutron activation of the isotope Mn-56 within the austenitic stainless steel handle is a primary source of β-emission via the following nuclear reactions:

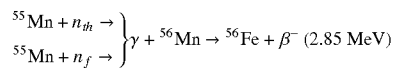

The notation "$n_{th}$" stands for a thermal neutron, and "$n_f$" denotes an epi-thermal neutron at the central energy of an absorption resonance. The cross-section for each reaction is about 13–14 barns, and the half-life of Mn-56 is about 2.58 hr.

Manganese is a key austenite stabilizer in stainless steels at a typical level of about two to six weight percent, which is a sufficient quantity of the isotope to produce significant β-flux when such steels are irradiated by neutron flux. For control blade handles formed from high strength austenitic stainless steels such as XM-19, which contains as much as six weight percent manganese, more than about 90% of the emitted β-particles has been determined to originate from the Mn-56 isotope, with maximum energy of 2.85 MeV. This is sufficiently high to ionize the fuel channels near the surface of the handles, creating a mechanism akin to common forms of corrosion, with sufficient β-flux being produced to result in the aforementioned shadow corrosion effect.

One approach to mitigate "shadow" corrosion involves the development of low manganese stainless steels. If manganese is simply removed from certain stainless steels that are used in components subject to a high neutron fluence, the stress corrosion resistance of the components decreases dramatically. The reduction or elimination of manganese would also increase the probability that at least a portion of the stainless steel would undergo the diffusionless martensite transformation to produce martensite, the presence of which is known to reduce the stress corrosion cracking resistance of a stainless steel. Therefore, to compensate for the reduction or loss of manganese, other compensatory austenite-stabilizing alloying elements, such as nickel, carbon and/or nitrogen, are added to the stainless steel.

While lower alloying levels of manganese serves to substantially reduce the shadow corrosion effect, any modification to the composition of a stainless steel for a nuclear reactor core component requires extensive qualification, including complete metallurgical and fabrication evaluation in both laboratory and in-reactor corrosion testing. This is an expensive, time consuming process with an uncertain probability of success. Accordingly, a more efficient approach is desired to reduce shadow corrosion within a nuclear reactor core without requiring any modification of the compositions of its components.

SUMMARY OF THE INVENTION

It is an object of this invention to reduce the shadow corrosion effect of zirconium-based alloys when positioned adjacent to materials containing elements that, when activated by neutron irradiation, emit β-particles.

It is a further object of this invention that reduced shadow corrosion of zirconium-based alloys is achieved without modifying the compositions of the alloys involved.

It is another object of this invention to achieve reduced shadow corrosion through the use of a coating that absorbs β-particles, thereby reducing the level of β-particles that can detrimentally interact with a neighboring zirconium-based alloy.

In accordance with a preferred embodiment of this invention, these and other objects and advantages are accomplished as follows.

According to the present invention, there is provided a technique for reducing the shadow corrosion effect in zirconium-based alloys to insignificant levels, while permitting the use of presently-qualified nuclear reactor materials, such as austenitic stainless steels. To do so, the present invention entails the use of coatings that are capable of absorbing β-particles, so as to mitigate the adverse effect of β-particle bombardment of a zirconium-based alloy. This technique can be applied to various nuclear reactor structural alloys that contain significant levels of at least one element that will emit β-particles when activated by neutron capture, such as stainless steels and nickel, platinum, copper, hafnium and yttrium-based alloys containing 0.2 weight percent manganese or more.

According to this invention, coating materials are selected on the basis of their properties being both effective to absorb β-particles, while also compatible with reactor operations. The selection of such materials is far from obvious, since many potential coating materials can be activated by n,γ reactions to become β-emitters themselves, thereby defeating the shielding scheme. According to this invention, certain materials capable of being applied as a coating have been determined to perform suitably as β-particle absorbers, though acting as weak emitters of β-rays. Such materials include beryllium oxide (beryllia; BeO), beryllium, tin, zinc, chromium and cadmium, though it is foreseeable that other suitable materials could be used. These materials are relatively dense with low activation cross-sections, low abundances of β-emitter parent isotopes and low maximum β-decay energy ($E_{max}$), when β-emitters are formed. In addition, each of these materials has isotopes that can be activated to β-emission, but at relatively low levels. Furthermore, these materials have melting points in excess of about 300° C., are compatible with the reactor water chemistry and environment, and can be deposited by such techniques as sputtering, electroplating and evaporation.

In view of the above, it can be seen that a significant advantage of this invention is that β-particles emitted from neutron-activated isotopes can be absorbed to the extent that insignificant levels of corrosion will occur in surrounding zirconium-based alloy components. In doing so, the invention utilizes nuclear and physical properties of a limited class of materials in synergistic combinations without disrupting the nuclear or chemical properties of the reactor, and without expensive, time-consuming qualification testing of new materials. Finally, the present invention is especially useful in reactor cores, where local protection is required by zirconium-based fuel channels against shadow corrosion induced by adjacent austenitic stainless steel components.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 is a schematic cross-sectional representation of a control blade and fuel channels of a nuclear reactor core;

FIG. 2 is a schematic cross-sectional representation of the fuel channels of FIG. 1, illustrating the shadow corrosion effect on the surfaces of the fuel channels;

FIG. 3 is a graphic representation of the surface β-flux of an austenitic stainless steel member.

DETAILED DESCRIPTION OF THE INVENTION

Figure 4:
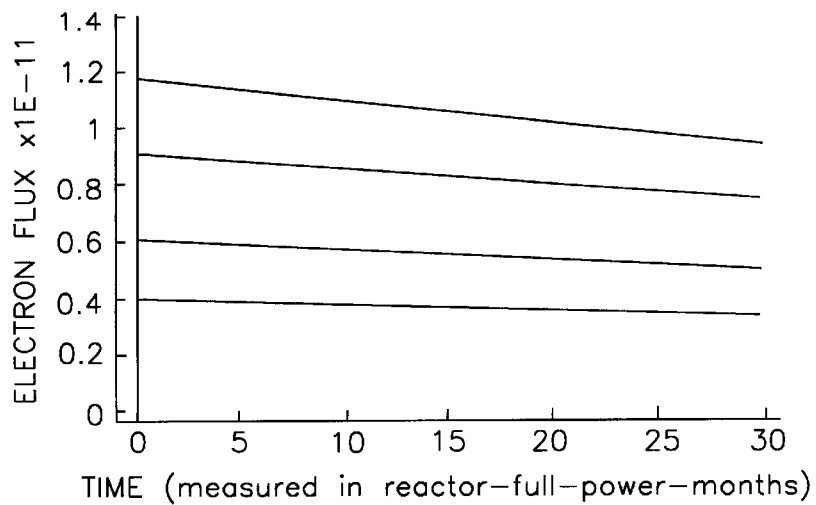
FIGS. 4 through 6 are graphic representations of the reduction of β-flux achieved with coating materials of various thicknesses in accordance with this invention.

The present invention provides coating materials that enable the use of presently-qualified nuclear reactor materials, while reducing shadow corrosion of zirconium-based alloys induced by β-particle emission from such reactor materials. While being particularly applicable to nuclear reactor components formed from austenitic stainless steels that contain significant levels of manganese (i.e., at least 0.2 weight percent), this invention can also be applied to other materials used to form nuclear reactor structural components, including those formed from nickel, platinum, copper, hafnium and yttrium-based alloys.

Represented in cross-section in FIG. 1 is a control blade 10 and two of four fuel channels 12 as they appear relative to each other within a nuclear rector core. The control blade 10 is formed from a neutron-absorbing material, such as cadmium, and has an X-shaped cross-section. Each of the fuel channels 12 is formed from a zirconium-based alloy, such as ZIRCALOY-2 or ZIRCALOY-4, and contains a nuclear fuel bundle (not shown). As indicated in FIG. 1, the control blade 10 is equipped with a handle 14 with which the control blade 10 can be raised or lowered as required during the refueling of the nuclear reactor core. Based on mechanical, environmental and physical requirements, the handle 14 is formed from a high strength austenitic stainless steel, such as XM-19 with a manganese content of up to about six weight percent.

Illustrated in FIG. 2 is shadow corrosion 16 imprinted on the channels 12 due to the handle 14 emitting β-particles as a result of the manganese content of the handle 14 becoming activated by neutron capture during exposure to radiation within the core. The high neutron flux in the reactor core activates the Mn-55 in the stainless steel handle 14, producing the β-emitter Mn-56 as discussed above. FIG. 3 graphically represents a typical activation curve for a manganese-containing stainless steel body, where the surface β-flux, φ, is about $10^{11}$ $cm^{-2}sec^{-1}$. Over time, the handle 14 emits sufficient β-particles that a ragged image of itself is etched in the surfaces of the channels 12 in the form of the corrosion 16 shown in FIG. 2. According to this invention, the tendency for shadow corrosion 16 to develop on the channels 12 is mitigated by providing a barrier of absorbing material, preferably in the form of a thin coating of absorbing material over the handle 14, which serves to reduce the β-flux to a level such that no significant damage occurs on the surfaces of the channels 12.

According to this invention, suitable absorbing materials must be carefully selected so that their properties are both effective and compatible with reactor operations. However, the selection of such materials is far from obvious, since many potential materials can be activated by n,γ reactions to become β-emitters themselves, thereby defeating the shielding effect. According to this invention, certain materials capable of being applied as a coating have been determined to perform suitably as β-particle absorbers, though acting as weak emitters of β-rays. Such materials include beryllium oxide (beryllia; BeO), beryllium, tin, zinc, chromium and cadmium, though it is foreseeable that other suitable materials could be used. Furthermore, it is foreseeable that coatings could be formed to contain one or more of such materials, and could include an active or passive matrix material.

An important characteristic of a β-emitter is the maximum of the β-energy spectrum. Furthermore, the absorption properties of a material depend on its density and the β-decay energy of the particular spectrum encountered, although the spectral details are unimportant. In general, lower values for β-decay energy, $E_{max}$, are indicative of higher absorption capabilities. Therefore, preferred coating materials, such as those noted above, are relatively dense with low activation cross-sections, low abundances of β-emitter parent isotopes and low values of $E_{max}$, when β-emitters are formed. In addition, the preferred coating materials can be deposited by such techniques as sputtering, electroplating and evaporation, though it is foreseeable that other deposition techniques could be employed to develop a coating of suitable thickness. Finally, the preferred materials have melting points in excess of the operating temperature within a reactor core (e.g., about 300° C.), and are compatible with the reactor water chemistry and environment.

Of the preferred coating materials noted above, beryllia, cadmium and chromium are considered in further detail below. Beryllia is a light ceramic, while the latter are dense metals. All have isotopes that can be activated to β-emission, but at relatively low levels. The pertinent reactions for these materials are as follows:

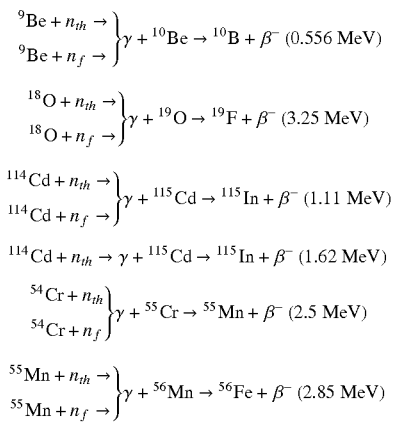

Subtle tradeoffs are illustrated by these reactions. Though beryllium activation in beryllia is negligible, a low level of activity results from its 0–18 content, resulting in a penetrating β-emission at 3.25 MeV. Advantageously, the activation cross-sections for both beryllium and oxygen are a fraction of a milli-barn. However, the specific gravity of beryllia is only about 3.01, so its stopping power is relatively weak, especially for high MeV β-particles generated internally and externally. The fluorine reaction product of beryllia is in small amounts as to not be problematic, though fluorine is chemically undesirable.

In comparison, the Cd-115 activity is higher because of larger activation cross-sections, on the order of a fraction of a barn up to about 23 barns. However, the density of cadmium is significantly greater (a specific gravity of about 8.65), and its β-energies are less. Therefore, cadmium has greater stopping power for both internally and externally generated β-particles than does beryllia. Furthermore, the ultimate reaction product, indium, does not pose a chemical problem, but care must be used in electroplating cadmium since its fumes can be toxic in sufficient concentration. A difficulty for high strength steels, such as XM-19, at temperatures above 230° C. is liquid metal embrittlement of the substrate underlying a cadmium coating. Therefore, cadmium coatings may not be suited for some in-core components. Also, because cadmium is a good thermal neutron absorber, its additional presence within a reactor core as a coating can have a detrimental effect on reactivity.

Finally, though chromium would not appear to be a good coating material because a product of Cr-54 activation is Mn-55, the primary instigator of the shadow corrosion effect of concern, Cr-54 is present in natural chromium to the extent of only about 2.36 weight percent. In addition, no other chromium isotopes activate to β-emitters, though all advantageously contribute to β-absorption. Therefore, chromium is a highly suitable coating material, especially since it is a fully acceptable metal for use in nuclear reactors.

Figure 5:
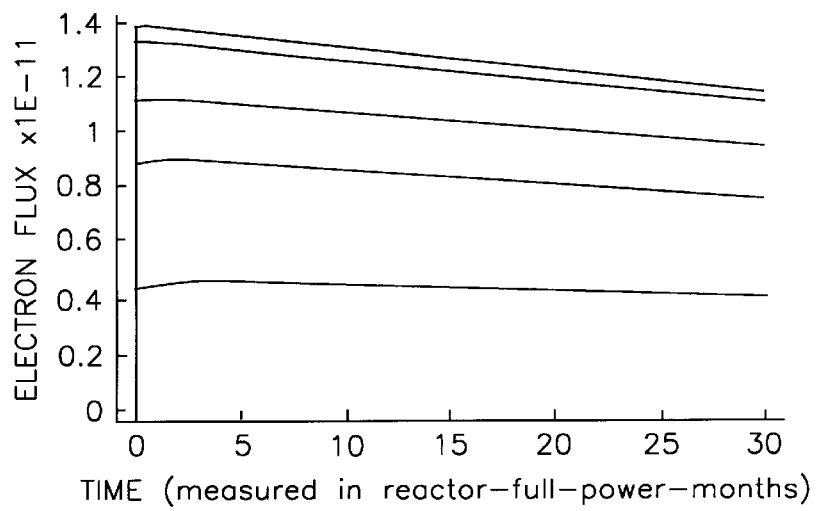
Figure 6:
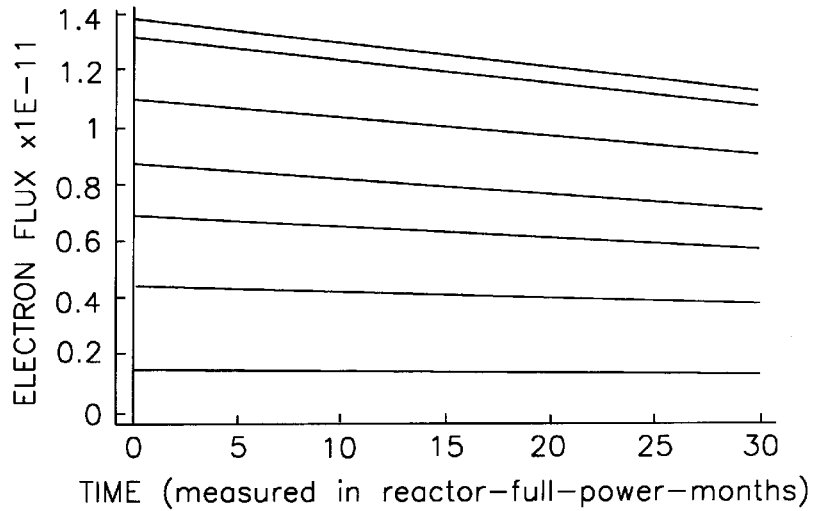

Quantitative assessment of the shielding effectiveness of coatings in accordance with this invention requires the solution of differential equations associated with the above reactions. Quantitative assessment must also take into consideration different coating thicknesses and surface β-flux. Such calculations also require knowledge of the neutron flux levels, both thermal and epi-thermal, in the core locations where the β-emitting component resides. The results for typical cases employing beryllia, cadmium and chromium coatings are shown in FIGS. 4 through 6, respectively.

From such an analysis, it is apparent that each candidate is effective as a coating material, with chromium being the most effective of those evaluated even though it is a much greater source of β-activity than is beryllia. The slopes of the flux characteristics are due to the consumption of Mn-55 as it is transmuted to Mn-56. Over very long periods of time, in terms of reactor full-power-months, the curves converge to zero. However, such periods are much longer than the life of the fuel bundles used. The time periods represented in FIGS. 4 through 6 are roughly equal to the time which a fuel bundle would typically be in a core. In practice, most fuel bundles are present for shorter times, such that a reduction in surface β-flux by a factor of about five to ten would result in shadow corrosion being correspondingly reduced to an insignificant level.

In view of the above, it can be seen that a significant advantage of the present invention is that coating materials are provided for suppressing β-particles arising from neutron-activated isotopes in nuclear reactor components that would otherwise promote shadow corrosion of nearby zirconium-based alloys. In this role, the coatings serve to reduce surface β-flux to benign levels without disrupting the nuclear or chemical properties of the reactor, and without expensive, time-consuming qualification testing of new materials. The present invention is especially useful in reactor cores, as represented in FIG. 1, where local protection is required by zirconium-based fuel channels 12 against shadow corrosion induced by the handle 14 of the control blade 10. Finally, those skilled in the art will appreciate that the coating materials of this invention, applied at appropriate thicknesses, are suitable to counter neutron flux conditions encountered by β-particle emitting components at various locations within a nuclear reactor core.

While the invention has been described in terms of a preferred embodiment, it is apparent that other forms could be adopted by one skilled in the art. Therefore, the scope of the invention is to be limited only by the following claims.

What is claimed is:

1. A nuclear reactor core comprising:
   a control blade having a handle whose composition is chosen from the group consisting of stainless steel, nickel-based alloys, platinum based-alloys, copper-based alloys, hafnium-based alloys and yttrium-based alloys containing at least about 0.2 weight percent manganese such that the handle emits β-particles when the manganese is activated by neutron capture, the handle having an outer surface completely covered with a coating for absorbing β-particles emitted by the handle, the coating consisting of one material chosen from the group consisting of beryllium oxide, metallic beryllium, metallic tin, metallic zinc, metallic chromium and metallic cadmium; and
   a fuel channel formed from a zirconium-based alloy;
   whereby the coating of the handle reduces corrosion of the fuel channel caused by irradiation of the fuel channel by β-particles emitted by the handle.

2. The nuclear reactor core as recited in claim 1 wherein the coating is chromium.

3. The nuclear reactor core as recited in claim 1 wherein the composition of the handle is austenitic stainless steel.

4. A nuclear reactor core as recited in claim 3 wherein the austenitic stainless steel of the handle contains about 0.2 to about 6 weight percent manganese.

* * * * *